(12) United States Patent
Lee et al.

(10) Patent No.: US 9,234,075 B2
(45) Date of Patent: Jan. 12, 2016

(54) POLYLACTIC ACID PREPARATION METHOD, POLYLACTIC ACID RESIN PREPARED USING THE METHOD, RESIN COMPOSITION COMPRISING THE POLYLACTIC ACID RESIN, AND CATALYST SYSTEM FOR PREPARING POLYLACTIC ACID

(71) Applicants: Samsung Electronics Co., Ltd., Suwon-si, Gyeonggi-do (KR); SNU R&DB Foundation, Seoul (KR)

(72) Inventors: Younghoon Lee, Incheon (KR); Chansu Kim, Seoul (KR); Hail Kwon, Incheon (KR); Changduk Kang, Gwacheon-si (KR); Jongchan Lee, Seoul (KR); Kwangmyung Cho, Seongnam-si (KR); Sangho Cha, Suwon-si (KR); Hyunkee Hong, Seoul (KR)

(73) Assignees: SAMSUNG ELECTRONICS CO., LTD., Suwon-Si (KR); SNU R&DB FOUNDATION, Seoul (KR)

( * ) Notice: Subject to any disclaimer, the term of this patent is extended or adjusted under 35 U.S.C. 154(b) by 0 days.

(21) Appl. No.: 14/507,514

(22) Filed: Oct. 6, 2014

(65) Prior Publication Data
US 2015/0225501 A1 Aug. 13, 2015

(30) Foreign Application Priority Data
Feb. 10, 2014 (KR) ........................ 10-2014-0014964

(51) Int. Cl.
C08G 63/02 (2006.01)
C08G 63/82 (2006.01)

(52) U.S. Cl.
CPC .................................. *C08G 63/823* (2013.01)

(58) Field of Classification Search
USPC ........................................ 528/271, 272, 281
See application file for complete search history.

(56) References Cited

U.S. PATENT DOCUMENTS

| | | |
|---|---|---|
| 5,142,023 A | 8/1992 | Gruber et al. |
| 5,247,058 A | 9/1993 | Gruber et al. |
| 5,258,488 A | 11/1993 | Gruber et al. |
| 5,338,822 A | 8/1994 | Gruber et al. |
| 5,359,026 A | 10/1994 | Gruber |
| 6,005,067 A | 12/1999 | Gruber et al. |
| 6,114,495 A | 9/2000 | Kolstad et al. |
| 6,121,410 A | 9/2000 | Gruber et al. |
| 6,353,086 B1 | 3/2002 | Kolstad et al. |
| 6,495,631 B1 | 12/2002 | Randall et al. |
| 8,114,939 B2 | 2/2012 | Babcock et al. |
| 2007/0264504 A1 | 11/2007 | Mitzi et al. |
| 2010/0152415 A1 | 6/2010 | Benson |
| 2010/0317797 A1 | 12/2010 | Rafler |
| 2012/0277403 A1 | 11/2012 | Sirol |

FOREIGN PATENT DOCUMENTS

| | | |
|---|---|---|
| CN | 1 651 479 A | 10/2005 |
| CN | 101402723 | 4/2009 |
| CN | 101402723 A | 8/2009 |
| CN | 101519526 * | 9/2009 |
| JP | 08-311176 B2 | 11/1996 |
| JP | 2006-225622 B2 | 8/2006 |
| KR | 20100067552 A | 6/2010 |
| WO | WO 94/07941 A1 | 4/1994 |
| WO | WO 94-07941 A1 | 4/1994 |
| WO | WO 99/50345 A1 | 10/1999 |

OTHER PUBLICATIONS

Schwach et al., "Stannous octoate-versus zinc-initiated polymerization of racemic lactide", *Polymer Bulletin*, 32: 617-623 (1994).

Gupta et al., "New emerging trends in synthetic biodegradable polymers—Polyactide: A critique", *European Polymer Journal*, 43:4053-4074 (2007).

Moon et al., "Melt Polycondensation of L-Lactic Acid with Sn(II) Catalysts Activated by Various Proton Acid:A Direct Manufacturing Route to High Molecular Weight Poly (L-lactic Acid)" *Journal of Polymer Science: Part A: Polymer Chemistry*, vol. 38, 1673-1679 (2000).

Extended European Search Report for Application No. 15153533.3-1301 mailed Jun. 16, 2015.

* cited by examiner

*Primary Examiner* — Terressa Boykin

(74) *Attorney, Agent, or Firm* — Leydig, Voit & Mayer, Ltd.

(57) ABSTRACT

A method of preparing polylactic acid by combining lactide with a main catalyst and cocatalyst, wherein the main catalyst includes an organometallic compound and a cocatalyst includes a nanoparticle; as well as a composition are provided.

35 Claims, 3 Drawing Sheets

POLYLACTIC ACID PREPARATION METHOD, POLYLACTIC ACID RESIN PREPARED USING THE METHOD, RESIN COMPOSITION COMPRISING THE POLYLACTIC ACID RESIN, AND CATALYST SYSTEM FOR PREPARING POLYLACTIC ACID

CROSS-REFERENCE TO RELATED APPLICATIONS

This application claims the benefit of Korean Patent Application No. 10-2014-0014964, filed on Feb. 10, 2014, in the Korean Intellectual Property Office, the entire disclosure of which is hereby incorporated by reference.

BACKGROUND

1. Field

The present inventive concept relates to a method of preparing polylactic acid, a polylactic acid resin prepared using the method, a resin composition including the polylactic acid resin, and a catalyst system for preparing polylactic acid.

2. Description of the Related Art

In view of environmental protection, there is increasing attention given to biodegradable resins such as aliphatic polyester. As a biodegradable resin, polylactic acid (or polylactide) has a high melting point of about 130° C. to about 180° C. and has good transparency. Lactic acid as a source material of polylactic acid may be obtained from renewable resources such as plants.

In general, polylactic acid may be synthesized by direct condensation polymerization of lactic acid or ring opening polymerization of lactide. The direct condensation polymerization of lactic acid is an equilibrium reaction. Thus, it is practically difficult to obtain a polylactic acid having a high molecular weight of about 100,000 or greater without removing the water produced during the equilibrium reaction under high temperature or reduced pressure. However, the ring opening polymerization of lactide does not generate a byproduct, and thus is suitable for preparing a high molecular weight polylactic acid.

In the ring opening polymerization of polylactic acid, a variety of catalysts may be used. For example, an organotin compound may be used as a catalyst. However, organotin compounds may cause a side reaction such as a chain transfer reaction during the ring opening polymerization. Thus it is difficult to prepare a high molecular weight polylactic acid with a high yield in a short period of time.

Therefore, there is still a need for a method of preparing a high molecular weight polylactic acid with a high yield in a short period of time.

SUMMARY

Provided herein is a method of preparing polylactic acid that includes performing ring opening polymerization of lactide in the presence of a main catalyst including an organometallic compound and a cocatalyst including a nanoparticle.

Also provided is a polylactic acid resin prepared by the above-described method.

Further provided is a resin composition includes the above-described polylactic acid resin.

Yet still provided are compositions useful for preparing polylactic acids.

Additional aspects will be set forth in part in the description which follows and, in part, will be apparent from the description, or may be learned by practice of the presented embodiments.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1A:
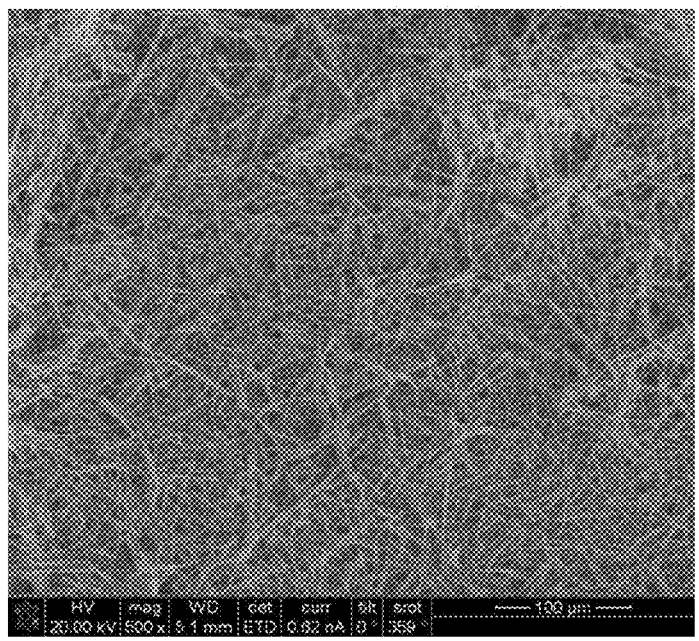
FIG. 1A is a scanning electron microscopic (SEM) image of a nanoparticle prepared in Preparation Example 1.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, embodiments of polylactic acid preparation methods, polylactic acid resins prepared using the methods, resin compositions including the polylactic acid resins, and compositions and catalyst systems for polylactic acid preparation will be described in greater detail.

As used herein, the terms "comprising" or "including", etc. are intended to specify the presence of stated elements or components, but do not preclude the presence or addition of one or more other elements or components.

As used herein, the term "lactide" refers to a cyclic di-ester of lactic acid and includes L-lactide (cyclic di-ester of L-lactic acid), D-lactide (cyclic di-ester of D-lactic acid), and a meso-lactide (cyclic di-ester of L-lactic acid and D-lactic acid).

As used herein, the term "polylactic acid resin" refers to any polymer that includes repeating units of lactic acid, which can be obtained by ring opening polymerization of lactide monomers. These polymers may include a homopolymer or a copolymer, but are not limited to a specific form of polymer. For examples, these polymers may be any polymers in a variety forms, for example, polymers that are unrefined or refined after the ring opening polymerization, polymers included in liquid or solid resin compositions before molding for an article, or polymers included in articles, such as plastics, films, or fabrics, obtained through processes such as molding.

As used herein, the term "organometallic compound" may include a compound having a chemical bond between a metal and an organic ligand, such as carbon, oxygen, nitrogen, or the like. The chemical bond may be, for example, a covalent bond, a coordinate bond, an ionic bond, or a combination thereof. For example, an organometallic compound may include a carbon-metal bond, an oxygen-metal bond, a nitrogen-metal bond, or the like.

As used herein, the term "nanoparticle" may refer to a particle having a size of less than about 1000 nm. For example, the nanoparticle may have a particle size of about 1 nm to about 999 nm.

According to an embodiment of the present disclosure, a method of preparing polylactic acid, the method comprising combining lactide with a main catalyst and cocatatlyst, wherein the main catalyst comprises an organometallic compound and a cocatalyst comprises a nanoparticle. In other words, a method of preparing polylactic acid includes performing ring opening polymerization of lactide in the presence of a main catalyst including an organometallic compound and a cocatalyst including a nanoparticle. Ring opening polymerization of lactide may be performed by combining the lactide with the main catalyst and cocatalyst.

In the polylactic acid preparation method, a catalyst system is employed that includes a cocatalyst comprising a nanoparticle, in addition to the main catalyst comprising an organometallic compound. The catalyst system increases catalytic activity. Thus it is possible to prepare the polylactic acid at a high conversion rate in a short period of time. The cocatalyst may be a heterogeneous catalyst that is indissoluble in a solution during the ring opening polymerization of the lactide.

In the polylactic acid preparation method, the cocatalyst may be a catalyst that facilitates a catalytic reaction of the main catalyst. The ring opening polymerization reaction may be performed exclusively by the main catalyst, without the cocatalyst. However, the addition of the cocatalyst may significantly increase the activity of the catalytic reaction. When only the cocatalyst is used i.e., without the main catalyst, the ring opening polymerization reaction may not proceed.

A reason why the catalytic activity is improved by the addition of the cocatalyst including the nanoparticle will now be described to help in understanding the present disclosure. It should not be interpreted in any respect to limit the scope of the present disclosure.

During the ring opening polymerization, it is believed the nanoparticle additionally coordinates with an intermediate compound resulting from coordination of the organometallic compound to the lactide, and stabilizes the intermediate compound, thereby reducing an activation energy of the catalytic reaction and then improving a reaction rate of the ring opening polymerization. In addition, or alternatively, it is believed the nanoparticle may provide an additional reaction site for the ring opening polymerization by the organometallic compound to increase the reaction rate of the ring opening polymerization.

The nanoparticle may be a metal-containing inorganic compound. The metal-containing inorganic compound refers to an inorganic compound including a metallic element and a nonmetallic element. The metal-containing inorganic compound excludes, for example, a compound consisting of only a nonmetallic element such as an organic compound, or a compound consisting of only a metalloid element or metallic element. Thus, the nanoparticle does not consist of only a metalloid, metal, or metal alloy.

The nanoparticle may include at least one metallic element selected from the group consisting of alkali earth metals, rare earth metals, transition metals, and metals of Group 13 to Group 15 of the periodic table of the elements. For example, the nanoparticle may include at least one metallic element selected from the group consisting of zinc (Zn), tin (Sn), antimony (Sb), aluminum (Al), magnesium (Mg), iron (Fe), titanium (Ti), zirconium (Zr), cobalt (Co), chromium (Cr), and yttrium (Y).

The nanoparticle may include at least one selected from the group consisting of metal oxide, metal nitride, and metal carbide. For example, the nanoparticle may include at least one selected from the group consisting of $ZnO$, $SnO$, $SnO_2$, $Sb_2O_3$, $Al_2O_3$, $MgO$, $Fe_2O_3$, $TiO_2$, $TiN$, $VN$, $NbN$, $GaN$, $Mo_2N$, $W_2N$, $CrN$, $NbC(N)$, $TiC(N)$, $WC$, $Mo_2C$, and $Cr_3C_2$, but is not limited thereto and any one or combination available as a catalyst for ring opening polymerization of the lactide can be used.

The nanoparticle may have a nanostructure shape selected from a rod, a sphere, a tetrahedron, a hexahedron, a fiber, and a star, wherein the shape is on a nano-scale dimension. For example, the nanoparticle may have a nanostructure of a nanorod, a nanosphere, a nanofiber, a nanobelt, a nanotetrahedron, a nanohexahedron, or a nanopolyhedron.

The nanoparticle may be nonporous. Common porous material, such as zeolite, may not be used. Furthermore, the nanoparticle is not a simple support for a catalyst; rather, the nanoparticle is a cocatalyst having its own catalytic activity.

In the polylactic acid preparation method, the nanoparticle may have a particle size of about 900 nm or less, but is not limited thereto. The particle size of the nanoparticle may be appropriately controlled to be within a range for improving the catalytic activity during the ring opening polymerization of lactide. The particle size of the nanoparticle refers to a particle size of primary nanoparticles, i.e., the largest distance between opposite ends of each particle. The particle size can be determined from the SEM image of the nanoparticles.

For example, the nanoparticle may have a particle size of about 1 nm to about 900 nm, and in some embodiments, about 1 nm to about 500 nm, and in some other embodiments, about 1 nm to about 300 nm, and in still other embodiments, about 1 nm to about 200 nm. For example, the nanoparticle may have a particle size of about 100 nm or less. For example, the nanoparticle may have a particle size of about 1 nm to about 100 nm, and in some embodiments, about 1 nm to about 80 nm, and in some other embodiments, about 1 nm to about 70 nm, and in some other embodiments, about 1 nm to about 60 nm, and in still other embodiments, about 1 nm to about 50 nm. In other embodiments, the nanoparticle may have a particle size of about 10 nm to about 100 nm, about 10 nm to about 80 nm, about 10 nm to about 70 nm, about 10 nm to about 60 nm, or about 10 nm to about 50 nm.

When the nanoparticle has the structure (shape) of a nanorod, the nanorod may have a major axis length of about 10 nm to about 100 nm, a minor axis length of about 1 nm to about 10 nm, and an aspect ratio of about 1:3 to about 1:100. When the nanoparticle has the structure (shape) of a nanosphere, the nanosphere may have a particle size of about 1 nm to about 50 nm, and in some embodiments, about 1 nm to about 30 nm, and in some other embodiments, about 1 nm to about 20 nm. When the nanoparticle has a nanotetrahedron structure, the nanotetrahedron may have a size of about 10 nm to about 80 nm, and in some embodiments, about 10 nm to about 70 nm, and in some other embodiments, about 20 nm to about 70 nm.

In the polylactic acid preparation method, the amount of the cocatalyst may be in a range of about 10 ppm to about 500 ppm based on a total weight of the lactide, but is not limited thereto. When the amount of the cocatalyst is within this range, a further improved catalytic activity may be attainable. For example, in the polylactic acid preparation method, the amount of the cocatalyst may be in a range of about 10 ppm to about 400 ppm, and in some embodiments, about 10 ppm to about 300 ppm, and in some other embodiments, about 10 ppm to about 300 ppm, and in some other embodiments, 100 ppm to about 200 ppm, and in still other embodiments, about 10 ppm to about 200 ppm, each based on the total amount by weight of the lactide.

A metallic element of the organometallic compound of the main catalyst may be at least one element selected from the group consisting of alkali earth metals, rare earth metals, transition metals, and metals of Group 13 to Group 15 of the periodic table of the elements. For example, the metallic element of the organometallic compound may be at least one element selected from the group consisting of magnesium (Mg), titanium (Ti), zirconium (Zr), zinc (Zn), tin (Sn), and aluminum (Al).

The organometallic compound may be a compound represented by Formula 1:

$$ML_a L'_b \qquad \text{<Formula 1>}$$

In Formula 1, M may be tin (Sn), zirconium (Zr), zinc (Zn), titanium (Ti), or aluminum (Al); a and b may be each independently an integer of 0 to 2, where $1 \leq a+b \leq 2$; and L and L' may be each independently a substituted or unsubstituted C3-C30 alkoxy group, a substituted or unsubstituted C3-C30 carboxylate group, or a substituted or unsubstituted C3-C30 dicarboxylate group.

The alkoxy group may be represented by —OR, where R is an alkyl group. This alkyl group is a linear or branched C3-C30 aliphatic hydrocarbon group.

The carboxylate group may be represented by —O(O═)CR, where R is an alkyl group. This alkyl group is a linear or branched C3-C30 aliphatic hydrocarbon group.

The carboxylate group may be represented by —O(O═)C—R'—C(═O)O—, where R' is an alkylene group. This alkylene group is a linear or branched C1-C28 aliphatic hydrocarbon group.

A substituent of the substituted alkoxy group, substituted carboxylate group, and substituted dicarboxylate group may be a hydroxy group or a C1-C10 alkyl group. The number of substituents of the alkoxy group, carboxylate group, or dicarboxylate group may be at least one, for instance two, three, or four.

Alternatively, the organometallic compound may be a compound represented by Formula 2:

$$SnL''_2 \qquad \text{<Formula 2>}$$

In Formula 2, L'' may be a substituted or unsubstituted C3-C30 alkoxy group or a substituted or unsubstituted C3-C30 carboxylate group. For example, L'' in Formula 2 may be one selected from the group consisting of —O(O═)C(CH$_2$)$_5$C$_3$H$_7$, —O(O═)C(CH$_2$)$_6$C$_2$H$_5$, —O(O═)C(CH$_2$)$_7$CH$_3$, —OC$_4$H$_9$, —OC$_6$H$_{13}$, and —OC$_8$H$_{17}$.

In the polylactic acid preparation method, the amount of the main catalyst may be in a range of about 10 ppm to about 1000 ppm based on a total weight of the lactide, but is not limited thereto. When the amount of the main catalyst is within this range, a further improved catalytic activity may be attainable. For example, in the polylactic acid preparation method, the amount of the main catalyst may be in a range of about 10 ppm to about 800 ppm, and in some embodiments, about 10 ppm to about 600 ppm, and in some embodiments, about 10 ppm to about 500 ppm, and in some other embodiments, about 10 ppm to about 400 ppm, and in some embodiments, about 10 ppm to about 300 ppm, and in some other embodiments, about 10 ppm to about 200 ppm, each based on the total weight of the lactide.

In the polylactic acid preparation method, a mole ratio of the main catalyst to the cocatalyst may be in a range of about 1:0.01 to 1:5. When the mole ratio of the main catalyst to the cocatalyst is within this range, a further improved catalyst activity may be attainable. For example, in the polylactic acid preparation method, the mole ratio of the main catalyst to the cocatalyst may be in a range of about 1:0.1 to 1:2. For example, in the polylactic acid preparation method, about 10 ppm to about 300 ppm of the cocatalyst, and in some embodiments, about 10 ppm to about 200 ppm of the cocatalyst, and in some other embodiments, about 10 ppm to about 100 ppm of the cocatalyst, may be used, each with respect to about 165 ppm of the main catalyst. For example, in the polylactic acid preparation method, about 30 ppm to about 100 ppm of the cocatalyst may be used with respect to about 165 ppm of the main catalyst.

In the polylactic acid preparation method, the lactide may be L-lactide, D-lactide, meso-lactide, or a mixture thereof. The lactide may have an acid value of about 50 meq/kg or less. For example, the lactide may have an acid value of about 1 meq/kg to about 30 meq/kg, and in some embodiments, about 1 meq/kg to about 10 meq/kg, and in some other embodiments, about 2 meq/kg to about 5 meq/kg.

In the polylactic acid preparation method, the ring opening polymerization of the lactide may be bulk polymerization substantially free of solvent. For example, the amount of solvent may be less than 1 mL per 1 kg of lactide. Due to the ring opening polymerization by bulk polymerization, a process for removing the solvent after the polymerization may be omitted, so that decomposition or loss of the polylactic acid that is likely to occur during the removing of the solvent may be prevented. A polylactic acid resin may also be prepared with a high conversion rate and a high yield by the bulk polymerization.

In some other embodiments, the ring opening polymerization of the lactide may be solution-phase polymerization including a solvent. The solvent for the solution-phase polymerization may be any solvent capable of dissolving the main catalyst and the lactide. For example, the solvent may be toluene, xylene, chloroform, dimethylchloride, diphenylether, or a mixed solvent thereof. In the solution-phase polymerization, low viscosity of a reaction solution may be maintained during the polymerization reaction, which may make it easy to mix and transport the reaction solution.

In the polylactic acid preparation method, the ring opening polymerization may be performed at a temperature of about 110° C. to about 230° C. for about 0.5 hours to about 5 hours. For example, the ring opening polymerization may be performed at a temperature of about 120° C. to about 210° C. for about 0.5 hours to about 2.5 hours, and in some embodiments, at a temperature of about 120° C. to about 200° C. for about 0.5 hours to about 1.5 hours. When the polymerization temperature is too low, the reaction rate may become slow. When the polymerization temperature is too high, a side reaction may occur. When the polymerization time is too short, it may be difficult to obtain polylactic acid having a large molecular weight. When the polymerization time is too long, depolymerization, decomposition, or discoloration of the polylactic acid may be more likely occur.

The ring opening polymerization may be performed in an inert atmosphere or a reducing atmosphere. That is, the ring opening polymerization may be performed in an oxygen-free atmosphere. For example, the ring opening polymerization may be performed in a nitrogen atmosphere.

In the polylactic acid preparation method, the ring opening polymerization reaction may be performed in the presence of an additional additive, in addition to the main catalyst and the cocatalyst.

The additive may include an initiator. The initiator may include a hydroxy group-containing compound. The initiator may substantially form a catalytic active species through a reaction with a catalyst, and the initiator may initiate the ring opening polymerization reaction. The initiator may be involved in partial depolymerization or decomposition of polylactic acid, and thus may be used for controlling a molecular weight of the polylactic acid.

The initiator is not specifically limited and may be any hydroxy group-containing compound. However, when the initiator has a low molecular weight, the initiator will likely vaporize and not take part in the ring opening polymerization reaction. Thus, the initiator is desirably a hydroxyl group-containing compound including at least 8 carbon atoms. For example, the initiator may be octanol, nonanol, or decanol.

The amount of the initiator may be in a range of about 1 ppm to about 1000 ppm based on a total weight of the lactide. For example, the amount of the initiator may be in a range of about 10 ppm to about 1000 ppm based on the total weight of the lactide.

Non-limiting examples of other additives include a metal deactivator, an antioxidant, a thermal stabilizer, a UV absorbent, a lubricant, a tackifier, a plasticizer, a cross-linking agent, a viscosity control agent, an antistatic agent, a flavoring agent, an antimicrobiral agent, a dispersant, and a polymerization inhibitor. These additives may be added within a range not to inhibit the effects of the present disclosure. These additives may be added after preparing a polylactic acid resin. These additives will be described in greater detailed herein when describing a polylactic acid resin composition.

In the polylactic acid preparation method, a conversion rate into the polylactic acid may be about 80% or greater, and in some embodiments, about 85% or greater, and in some other embodiments, about 90% or greater. For example, in the polylactic acid preparation method a conversion rate into the polylactic acid in 45 minutes after the initiation of the polymerization (i.e., the addition of the catalyst) may be about 90% or greater, and in some embodiments, about 92% or greater, and in some other embodiments, about 94% or greater.

In the polylactic acid preparation method, a molecular weight of the polylactic acid may be easily controlled depending on the use thereof by adjusting the amounts of the main catalyst and cocatalyst, the reaction temperature, and the reaction time.

In the polylactic acid preparation method, a polylactic acid having a high molecular weight may be prepared in a high conversion rate within a short time, in comparison with conventional methods, by using a catalyst having a high activity. Due to the progress of the ring opening polymerization within a short time, depolymerization, decomposition, or discolorization of the polylactic acid may be reduced.

The nanoparticle used in the polylactic acid preparation method may be prepared by any method, without limitation. One example of a method of preparing the nanoparticle is hydrothermal synthesis. For example, the polylactic acid may be prepared by heating a mixture of a metal precursor with an oxygen-containing solvent and, optionally, heating the mixture.

The metal precursor, which is a compound including a metallic element of the nanoparticle, is not specifically limited as long as the metal precursor is a compound dissolvable in the oxygen-containing solvent. For example, the metal precursor may be a precursor of at least one metallic element selected from the group consisting of alkali earth metals, rare earth metals, transition metals, and metals of Group 13 to Group 15 of the periodic table of the elements. For example, the metal precursor may be a precursor of at least one metallic element selected from the group consisting of zinc (Zn), tin (Sn), antimony (Sb), aluminum (Al), magnesium (Mg), iron (Fe), titanium (Ti), zirconium (Zr), cobalt (Co), chromium (Cr), and yttrium (Y). For example, the metal precursor may be $Zn(CH_2COO)_2$, $ZnCl_2$, or the like.

The oxygen-containing solvent may be, for example, alcohol or ether. For example, the oxygen-containing solvent may be methanol or ethanol.

The heating of the mixture may be performed under reflux at a temperature of about 70° C. to about 90° C. for about 1 hour to about 2 hours. As a result of the heating, the nanoparticle powder is obtained.

According to another embodiment of the present disclosure, there is provided a polylactic acid resin prepared by the polylactic acid preparation methods described herein. The polylactic acid resin may include a repeating unit represented by Formula 3.

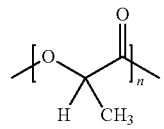

<Formula 3>

The lactide, a monomer precursor for the polylactic acid resin, may have an acid value of about 50 meq/kg or less, but is not limited thereto. When the acid value of the lactide for the polylactic acid resin is within this range, the polylactic acid resin may have improved physical properties. For example, the lactide, a monomer precursor for the polylactic acid resin, may have an acid value of about 1 meq/kg to about 50 meq/kg, and in some embodiments, about 1 meq/kg to about 30 meq/kg, and in some other embodiments, about 1 meq/kg to about 10 meq/kg, and in still other embodiments, about 2 meq/kg to about 5 meq/kg.

For example, the polylactic acid resin may have a weight average molecular weight of about 100,000 to about 500,000, and in some embodiments, about 100,000 to about 300,000. When the weight average molecular weight of the polylactic acid resin is less than 100,000, the polylactic acid resin may have poor mechanical properties. When the weight average molecular weight of the polylactic acid resin is greater than 500,000, it may difficult to process the polylactic acid resin.

The polylactic acid resin may include at least one selected from the group consisting of a catalyst-based residual metal and a catalyst-based nanoparticle. For example, the polylactic acid resin may include a catalyst-based metal oxide nanoparticle. For example, the polylactic acid resin may include a catalyst-based metal, i.e., a metal originated from the catalyst. The catalyst-based residual metal may include magnesium (Mg), titanium (Ti), zirconium (Zr), zinc (Zn), tin (Sn), and aluminum (Al). The catalyst-based residual nanoparticle may include ZnO, SnO, $SnO_2$, $Sb_2O_3$, $Al_2O_3$, MgO, $Fe_2O_3$, $TiO_2$, TiN, VN, NbN, GaN, $Mo_2N$, $W_2N$, CrN, NbC(N), TiC(N), WC, $Mo_2C$, and $Cr_3C_2$.

According to another embodiment of the present disclosure, provided is a resin composition including a polylactic acid resin prepared using a method described herein. The polylactic acid resin composition may include the polylactic acid resin only or together with an additional other resin. For example, the polylactic acid resin composition may further include a polycarbonate resin, an acrylonitrile butadiene styrene (ABS) resin, or a polypropylene resin. In the polylactic acid resin composition, the amount of the polylactic acid resin is not specifically limited. For example, the amount of the polylactic acid resin in the polylactic acid resin composition may be about 10 wt % or greater, and in some embodiments, about 20 wt % or greater, and in some other embodiments, about 30 wt % or greater, and in some other embodiments, about 40 wt % or greater, and in still other embodiments, about 50 wt % or greater, but is not limited thereto.

The polylactic acid resin composition may be in a liquid phase or a solid phase. The polylactic acid resin composition may be a composition before molding for a final article, a molded article (molded product) resulting from the molding, a film, or a fabric. The molded article, fabric, and film may be obtained by a common forming method thereof.

The polylactic acid resin composition may further include an additive that is commonly used in conventional resin compositions. For example, the additive may be a filling agent, a terminal blocking agent, a metal deactivator, an antioxidant, a thermal stabilizer, a UV absorbent, a lubricant, a tackifier, a plasticizer, a cross-linking agent, a viscosity control agent, an antistatic agent, a flavoring agent, an antimicrobiral agent, a dispersant, or a polymerization inhibitor. These additives may be added within a range not to inhibit physical properties of the resin composition.

The resin composition may include a filling agent, for example, an inorganic filling agent, such as talc, wollastonite, mica, clay, montmorillonite, smectite, caolin, zeolite (aluminum silicate), and an anhydrous amorphous aluminum silicate obtained via an acid treatment and heating of zeolite. When the resin composition includes such a filling agent, the amount of the filling agent in the resin composition may be in a range of about 1 wt % to about 20 wt % based on a total weight of the resin so that impact resistance of a molded product manufactured therefrom can be maintained.

The resin composition may include a carbodiimide compound as a terminal blocking agent, for example, a polycarbodiimide compound or a monocarbodiimide compound. The carbodiimide compound may block a side reaction such as hydration via reaction with some or all of terminal carboxyl groups of the polylactic acid resin, and thus may improve water resistance of a molded product including the resin composition, and consequently improve the durability of the molded product including the resin composition under a high-temperature, high-humidity environment.

Non-limiting examples of the polycarbodiimide compound are, for example, poly(4,4'-diphenylmethane carbodiimide), poly(4,4'-dicyclohexylmethane carbodiimide), poly(1,3,5-triisopropylbenzene)polycarbodiimide, poly(1,3,5-triisopropylbenzene)polycarbodiimide, and poly(1,5-diisopropylbenzene)polycarbodiimide. The monocarbodiimide compound may be, for example, N,N'-di-2,6-diisopropylphenylcarbodiimide.

The amount of the carbodiimide compound may be in a range of about 0.1 wt % to about 3 wt % based on a total weight of the resin composition. When the amount of the carbodiimide compound is less than 0.1 wt %, durability improvement in the molded product may be negligible. When the amount of the carbodiimide compound is greater than 3 wt %, the molded product may have weak mechanical strength.

The resin composition may include a stabilizer or a coloring agent to stabilize the molecular weight of the resin composition or color of the resin composition during molding. The stabilizer may be a phosphorous-based stabilizer, a hindered phenol-based stabilizer, a UV absorbent, a thermal stabilizer, or an antistatic agent.

Non-limiting examples of the phosphorous-based stabilizer are phosphorous acid, phosphoric acid, phosphonic acid, and esters thereof, including a phosphate compound, a phosphate compound, a phosphonite compound, and a phosphonate compound, and a tertiary phosphine.

Non-limiting examples of the stabilizer including a phosphonite compound as a main compound are Sandostab P-EPQ (Clariant) and Irgafos P-EPQ (CIBA SPECIALTY CHEMICALS).

Non-limiting examples of the stabilizer including a phosphate compound as a main component are PEP-8 (Asahi Denka Kogyo K.K.), JPP681S (Tohoku Chemical Co.), PEP-24G (Asahi Denka Kogyo K.K.), Alkanox P-24 (Great Lakes), Ultranox P626 (GE Specialty Chemicals), Doverphos S-9432 (Dover Chemical), Irgaofos126, 126 FF(CIBA SPECIALTY CHEMICALS), PEP-36 (Asahi Denka Kogyo K.K.), PEP-45 (Asahi Denka Kogyo K.K.), and Doverphos S-9228 (Dover Chemical).

The hindered phenol-based stabilizer (antioxidant) may be a compound that is commonly used in conventional resins (resin compositions). A non-limiting example of the hindered phenol-based stabilizer is 3,9-bis[2-{3-(3-t-butyl-4-hydroxy-5-methylphenyl)propionyloxy}-1,1-dimethylethyl]-2,4,8,10-tetraoxaspiro[5,5]undecane. The hindered phenol-based stabilizer may be any hindered phenol-based compound used as an oxidation stabilizer for a resin composition in the art.

The amount of the phosphorous-based stabilizer or the hindered phenol-based antioxidant (stabilizer) in the resin composition may be in a range of about 0.005 wt % to about 1 wt % based on a total weight of the resin composition.

The resin composition may include a UV absorbent. The inclusion of the UV absorbent may suppress a deterioration in weather resistance of the molded product caused by a rubber component or a flame retardant. Non-limiting examples of the UV absorbent are benzophenone-based UV absorbents, benzotriazole-based UV absorbents, hydroxyphenyl triazine-based UV absorbents, cyclic imino ester-based UV absorbents, and cyanoacrylate-based UV absorbents. In the resin composition, the amount of the UV absorbent may be in a range of about 0.01 wt % to about 2 wt % based on a total weight of the resin composition.

The resin composition may include a coloring agent, for example, a dye or a pigment, to provide colors to the molded product manufactured therefrom.

The resin composition may include an anti-static agent to provide anti-static performance to the molded product manufactured therefrom.

The polylactic acid resin composition may further include a thermoplastic resin, a fluidity modifying agent, an antimicrobiral agent, a dispersant such as liquid paraffin, a photocatalytic antipollutant, a heat absorbing agent, and a photochromic agent, in addition to the above-listed additives.

A molded product manufactured from the resin composition may be a case or an inner part of an electronic good for electric office machines or home appliances, a sheet, or a film. Examples of the electric office machines or home appliances are mobile phones, table holders for mobile phones, copy machine, printers, a case of a liquid crystal projector, exterior materials of televisions and office automation equipment, and interior materials of refrigerators.

According to another embodiment of the present disclosure, a catalyst system for preparing polylactic acid includes a main catalyst including an organometallic compound, and a cocatalyst including a nanoparticle.

Due to the inclusion of the cocatalyst including a nanoparticle, further to the main catalyst including an organometallic compound, the catalyst system may have an increased catalytic activity to prepare polylactic acid having a large molecular weight via the ring opening polymerization of the lactide at a high conversion rate in a short time in comparison to a catalyst system without a cocatalyst including a nanoparticle.

In the catalyst system a mole ratio of the main catalyst to the cocatalyst may be in a range of about 1:0.1 to about 1:3. For example, the mole ratio of the main catalyst to the cocatalyst in the catalyst system may be in a range of about 1:0.1 to about 1:2.

All other aspects of the catalyst system (e.g., the main catalyst and the cocatalyst) are as previously described herein with respect to the method of preparing a polylactic acid.

In another embodiment, there is provide a composition useful for preparing a polylactic acid, the composition comprising a lactide, a polylactic acid, or a combination thereof; a main catalyst including an organometallic compound, and a cocatalyst including a nanoparticle. The composition can be provided by combining the catalyst system with a lactide. All other aspects of the composition are as previously described herein with respect to the method of preparing a polylactic acid.

One or more embodiments of the present inventive concept will now be described in detail with reference to the following examples. However, these examples are only for illustrative purposes and are not intended to limit the scope of the one or more embodiments of the present inventive concept.

PREPARATION OF NANOPARTICLE

Preparation Example 1

Preparation of ZnO (Rod Type) Nanoparticle $Zn(CH_3COO)_2 \cdot 2H_2O$ was added to 150 mL of ethanol and stirred to prepare a 0.1 M $Zn(CH_3COO)_2 \cdot 2H_2O$ solution. This solution was put into a stainless reactor and refluxed at about 80° C. for about 1 hour, and a solution of 0.5 g of KOH dissolved in 5 mL of water was put therein for reaction. After completion of the reaction, the reaction product was naturally cooled down to room temperature to obtain white solid powder, which was then washed with methanol, filtered, and dried in a 60° C. oven, thereby preparing a ZnO nanoparticle.

Referring to FIG. 1A, the ZnO nanoparticle was found to have a nanorod shape (structure) having a major axis length of about 10 nm to about 100 nm and a minor axis length of about 1 nm to about 10 nm.

Preparation Example 2

Preparation of ZnO (Sphere Type) Nanoparticle $Zn(CH_3COO)_2 \cdot 2H_2O$ was added to 150 mL of ethanol and stirred to prepare a 0.1 M $Zn(CH_3COO)_2 \cdot 2H_2O$ solution. This solution was put into a stainless reactor and refluxed at about 80° C. for about 1 hour, and a solution of 0.5 g of KOH dissolved in 5 mL of ethanol was put thereto for reaction. After completion of the reaction, the reaction product was naturally cooled down to room temperature to obtain white solid powder, which was then washed with methanol, filtered, and dried in a 60° C. oven, thereby preparing a ZnO nanoparticle.

Figure 1B:
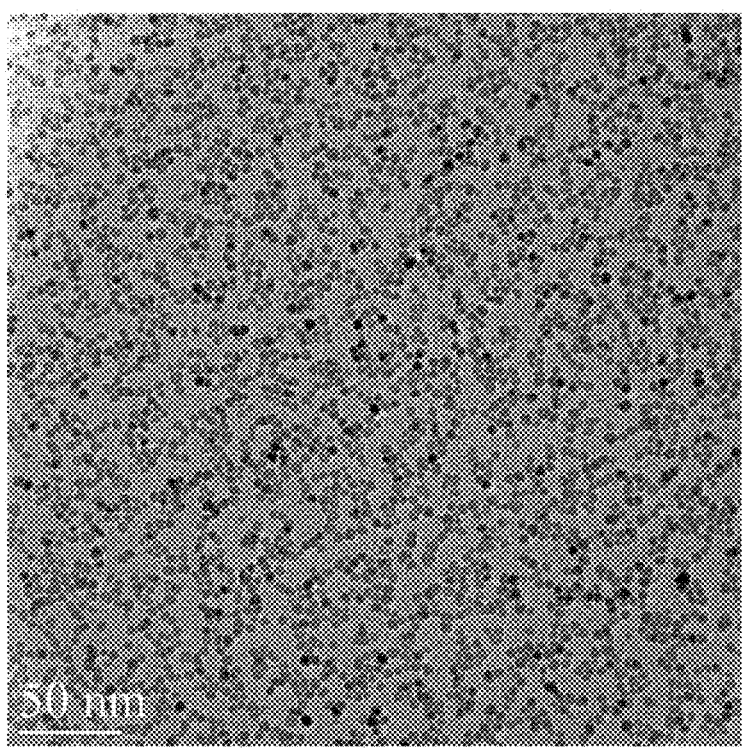
FIG. 1B is an SEM image of a nanoparticle prepared in Preparation Example 2.

Referring to FIG. 1B, the ZnO nanoparticle was found to have a nanosphere shape (structure) having a size of about 1 nm to about 20 nm.

Preparation Example 3

Preparation of ZnO (Tetrahedron Type) Nanoparticle $Zn(CH_3COO)_2 \cdot 2H_2O$ was added to 150 mL of methanol to prepare a 0.1 M $Zn(CH_3COO)_2 \cdot 2H_2O$ solution. This solution was put into a stainless reactor and refluxed at about 80° C. for about 1 hour, and a solution of 0.5 g of KOH dissolved in 5 mL of methanol was put thereto for reaction. After completion of the reaction, the reaction product was naturally cooled down to room temperature to obtain white solid powder, which was then washed with methanol, filtered, and dried in a 60° C. oven, thereby preparing a ZnO nanoparticle.

Figure 1C:
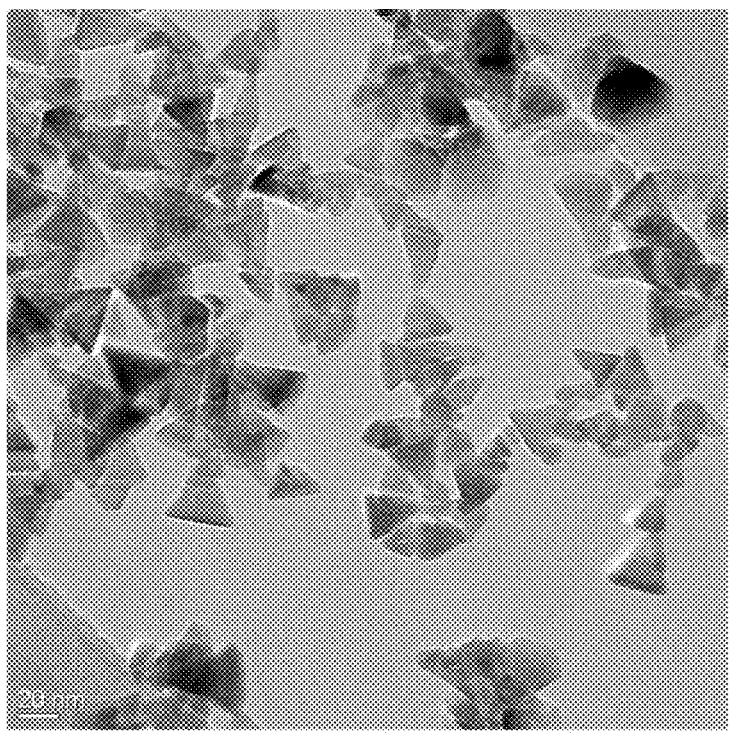
FIG. 1C is an SEM image of a nanoparticle prepared in Preparation Example 3.

Referring to FIG. 1C, the ZnO nanoparticle was found to have a nanotetrahedron shape (structure) having a size (diagonal length) of about 25 nm to about 60 nm.

PREPARATION OF POLYLACTIC ACID

Example 1

Use of $Sn(Oct)_2$ (165 ppm) and ZnO Nanotetrahedron Particle (50 ppm)

80 g of L-lactide powder (solid phase) having an acid value of about 5 meqKOH/Kg or less and a moisture content of about 100 ppm or less was put into a 150-mL reactor, and moisture and oxygen were removed therefrom in a reduced pressure and in a vacuum, respectively. After nitrogen was supplied into the reactor to create a nitrogen atmosphere, the reactor was heated in the nitrogen atmosphere to about 120° C. while stirring to completely dissolve L-lactide.

After the temperature of the dissolved L-lactide was raised to about 170° C., 36 ul (microliters) of $Sn(Oct)_2$ (stannous octoate, available from Sigma-Aldrich) and 4 mg of the ZnO nanoparticle of Preparation Example 3 were simultaneously added thereto while stirring, followed by polymerization for about 1.5 hours while the temperature of the reaction was maintained at about 170° C. After termination of the polymerization and stopping the stirring, a drain valve in the bottom of the reactor was opened, and nitrogen was supplied into the reactor to push down a high-viscosity polylactic acid resin out of the reactor, thereby obtaining a polylactic acid resin.

This polylactic acid resin had a conversion rate of about 94.4% when collected 45 minutes after the adding of catalysts and had a weight average molecular weight of about 304,000 g/mol.

Example 2

Use of $Sn(Oct)_2$ (165 Ppm) and ZnO Nanotetrahedron Particle 100 ppm)

A polylactic acid resin was prepared in the same manner as in Example 1, except that the amount of the ZnO nanoparticle of Preparation Example 3 was changed to 100 ppm.

This polylactic acid resin had a conversion rate of about 91% when collected 45 minutes after the adding of catalysts and had a weight average molecular weight of about 304,000 g/mol.

Example 3

Use of $Sn(Oct)_2$ (165 ppm) and ZnO Nanotetrahedron Particle (300 ppm)

A polylactic acid resin was prepared in the same manner as in Example 1, except that the amount of the ZnO nanoparticle of Preparation Example 3 was changed to 300 ppm.

This polylactic acid resin had a conversion rate of about 89.2% when collected 45 minutes after the adding of catalysts and had a weight average molecular weight of about 235,000 g/mol.

Example 4

Use of ZnO Nanosphere Particle

A polylactic acid resin was prepared in the same manner as in Example 1, except that the ZnO nanosphere particle of Preparation Example 2, instead of the ZnO nanoparticle (nanotetrahedron) of Preparation Example 3, was used.

This polylactic acid resin had a conversion rate of about 91.3% when collected 45 minutes after the adding of catalysts and had a weight average molecular weight of about 285,000 g/mol.

Example 5

Use of ZnO Nanorod Particle

A polylactic acid resin was prepared in the same manner as in Example 1, except that the ZnO nanoparticle (nanorod) 100 ppm of Preparation Example 1, instead of the ZnO nanoparticle (nanotetrahedron) of Preparation Example 3, was used.

This polylactic acid resin had a conversion rate of about 92.5% when collected 45 minutes after the adding of catalysts and had a weight average molecular weight of about 324,000 g/mol.

Example 6

A polylactic acid resin was prepared in the same manner as in Example 1, except that an $SnO_2$ nanoparticle, instead of the ZnO nanoparticle (nanotetrahedron) of Preparation Example 3, was used.

Example 7

A polylactic acid resin was prepared in the same manner as in Example 1, except that a $TiO_2$ nanoparticle, instead of the ZnO nanoparticle (nanotetrahedron) of Preparation Example 3, was used.

Comparative Example 1

Use of $Sn(Oct)_2$ (165 ppm)

A polylactic acid resin was prepared in the same manner as in Example 1, except that the ZnO nanoparticle of Preparation Example 3 was not added.

This polylactic acid resin had a conversion rate of about 90.7% when collected 45 minutes after the adding of catalysts and had a weight average molecular weight of about 186,000 g/mol.

Comparative Example 2

Use of ZnO Nanorod Particle (50 ppm)

A polylactic acid resin was prepared in the same manner as in Example 1, except that $Sn(Oct)_2$ was not added.

Comparative Example 2 in which only the ZnO nanoparticle as a cocatalyst was added, nearly no polymerization occurred.

Weight average molecular weights (Mw) of the polylactic acid resins of Examples 1 to 7 and Comparative Examples 1 and 2 were measured by gel permeation chromatography (GPC) using polystyrene as a reference material. Each of the polylactic acid resins was dissolved in tetrahydrofuran (THF) for GPC.

Figure 2:
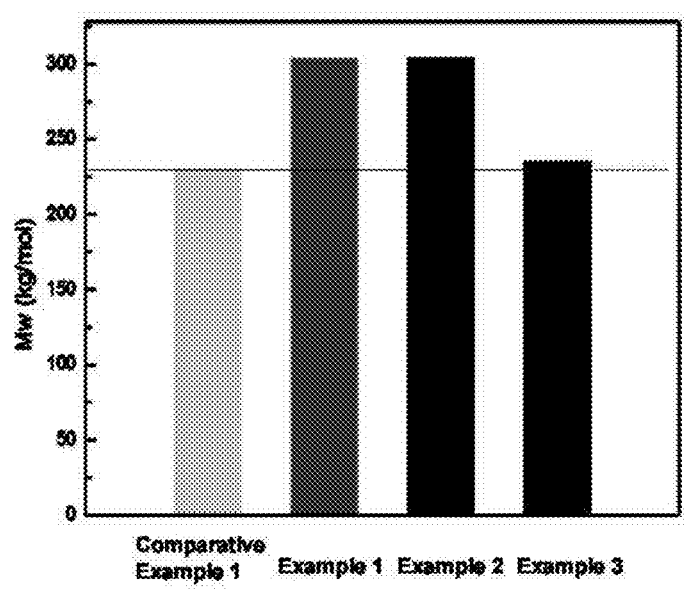
FIG. 2 is a graph of weight average molecular weights of polylactic acid resins prepared in Examples 1 to 3 and Comparative Example 1.
Figure 3:
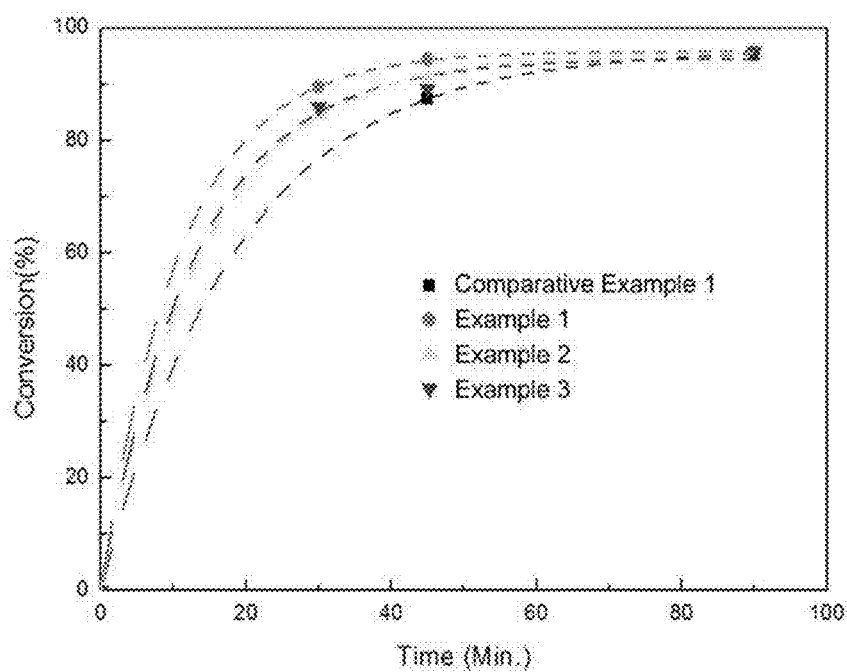
FIG. 3 is a graph of conversion rate with respect to polymerization time of the polylactic acid resins prepared in Examples 1 to 3 and Comparative Example 1.

Some results of the polymerization for about 45 minutes in Examples 1 to 7 and Comparative Examples 1 and 2 are shown in Table 1 and FIGS. 2 and 3.

TABLE 1

| Example | Conversion rate [%] | Weight average molecular weight [g/mol] |
| --- | --- | --- |
| Comparative Example 1 | 90.7 | 186,000 |
| Comparative Example 2 | below 10 | — (no polymerization) |
| Example 1 | 94.4 | 304,000 |
| Example 2 | 91 | 304,000 |
| Example 3 | 89.2 | 235,000 |
| Example 4 | 91.3 | 285,000 |
| Example 5 | 92.5 | 324,000 |

Referring to Table 1, in Examples 1 to 5 where the polymerization was performed using the catalyst systems including both a main catalyst and a cocatalyst, the conversion rates into polylactic acid resin and the weight average molecular weights of the polylactic acid were significantly higher than those of the polylactic acid resins of Comparative Examples 1 prepared by using only a main catalyst and Comparative Example 2 prepared by using only a cocatalyst.

In other words, the use of catalyst systems including both a main catalyst and a cocatalyst (Examples 1 to 7) significantly increased catalytic activity so that polylactic acids having large molecular weights were obtained in a short time at a high conversion rate.

As described above, according to the one or more of the above embodiments of the present inventive concept, a polylactic acid having a large molecular weight may be prepared in a short time at a high conversion rate by using a catalyst system that not only uses a main catalyst but also uses a cocatalyst including a nanoparticle.

It should be understood that the exemplary embodiments described therein should be considered in a descriptive sense only and not for purposes of limitation. Descriptions of features or aspects within each embodiment should typically be considered as available for other similar features or aspects in other embodiments.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method of preparing polylactic acid, the method comprising combining lactide with a main catalyst and cocatalyst, wherein the main catalyst comprises an organometallic compound and the cocatalyst comprises a nanoparticle.

2. The method of claim 1, wherein the nanoparticle comprises a metal-containing inorganic compound.

3. The method of claim 1, wherein the nanoparticle comprises at least one metallic element selected from the group consisting of alkali earth metals, rare earth metals, transition metals, and metals of Group 13 to Group 15 of the periodic table of the elements.

4. The method of claim 1, wherein the nanoparticle comprises at least one metallic element selected from the group consisting of zinc (Zn), tin (Sn), antimony (Sb), aluminum (Al), magnesium (Mg), iron (Fe), titanium (Ti), zirconium (Zr), cobalt (Co), chromium (Cr), and yttrium (Y).

5. The method of claim 1, wherein the nanoparticle comprises at least one selected from the group consisting of metal oxide, metal nitride, and metal carbide.

6. The method of claim 1, wherein the nanoparticle comprises at least one selected from the group consisting of ZnO, SnO, $Sb_2O_3$, $Al_2O_3$, MgO, $Fe_2O_3$, $TiO_2$, TiN, VN, NbN, GaN, $Mo_2N$, $W_2N$, CrN, NbC(N), TiC(N), WC, $Mo_2C$, and $Cr_3C_2$.

7. The method of claim 1, wherein the nanoparticle has a nanostructure.

8. The method of claim 7, wherein the nanoparticle has a nanostructure selected from a nanorod, a nanosphere, a nanotetrahedron, a nanohexahedron, a nanofiber, and a nanostar.

9. The method of claim 1, wherein the nanoparticle is nonporous.

10. The method of claim 1, wherein the nanoparticle has a particle size of about 900 nm or less.

11. The method of claim 1, wherein the nanoparticle has a particle size of about 1 nm to about 80 nm.

12. The method of claim 1, wherein about 10 ppm to about 500 ppm of the cocatalyst is present based on a total weight of the lactide.

13. The method of claim 1, wherein the organometallic compound comprises at least one element selected from the group consisting of alkali earth metals, rare earth metals, transition metals, and metals of Group 13 to Group 15 of the periodic table of the elements.

14. The method of claim 1, wherein the organometallic compound comprises at least one element selected from the group consisting of magnesium (Mg), titanium (Ti), zirconium (Zr), zinc (Zn), tin (Sn), and aluminum (Al).

15. The method of claim 1, wherein the organometallic compound is represented by Formula 1:

$ML_aL'_b$                                                             <Formula 1> wherein, M is tin (Sn), zirconium (Zr), zinc (Zn), titanium (Ti), or aluminum (Al);

a and b are each independently an integer of 0 to 2, where $1 \leq a+b \leq 2$; and L and L' are each independently a C3-C30 alkoxy group, a C3-C30 carboxylate group, or a C3-C30 dicarboxylate group, any of which may be substituted or unsubstituted.

16. The method of claim 1, wherein the organometallic compound is represented by Formula 2:

$SnL''_2$                                                              <Formula 2> wherein L" is a substituted or unsubstituted C3-C30 alkoxy group or a substituted or unsubstituted C3-C30 carboxylate group.

17. The method of claim 16, wherein L" is —O(O═)C(CH$_2$)$_5$C$_3$H$_7$, —O(O═)C(CH$_2$)$_6$C$_2$H$_5$, —O(O═)C(CH$_2$)$_7$CH$_3$, —OC$_4$H$_9$, —OC$_6$H$_{13}$, or —OC$_8$H$_{17}$.

18. The method of claim 1, wherein about 10 ppm to about 1000 ppm of the main catalyst is present based on a total weight of the lactide.

19. The method of claim 1, wherein a mole ratio of the main catalyst to the cocatalyst is in a range of about 1:0.01 to 1:3.

20. The method of claim 1, wherein a mole ratio of the main catalyst to the cocatalyst is in a range of about 1:0.1 to 1:2.

21. The method of claim 1, wherein combining lactide with a main catalyst and cocatalyst results in ring-opening polymerization, and the ring opening polymerization is bulk polymerization.

22. The method of claim 1, wherein combining lactide with a main catalyst and cocatalyst results in ring-opening polymerization, and the ring opening polymerization is performed at a temperature of about 110° C. to about 230° C. for about 0.5 to about 5 hours.

23. A composition comprising
a lactide, polylactic acid, or combination thereof,
a main catalyst comprising an organometallic compound; and
a cocatalyst comprising a nanoparticle.

24. The composition of claim 23, wherein the nanoparticle comprises a metal-containing inorganic compound.

25. The composition of claim 23, wherein the nanoparticle comprises at least one metal selected from the group consisting of zinc (Zn), tin (Sn), antimony (Sb), aluminum (Al), magnesium (Mg), iron (Fe), titanium (Ti), zirconium (Zr), cobalt (Co), chromium (Cr), and yttrium (Y).

26. The composition of claim 23, wherein the nanoparticle comprises at least one selected from the group consisting of metal oxide, metal nitride, and metal carbide.

27. The composition of claim 23, wherein the nanoparticle comprises at least one selected from the group consisting of ZnO, SnO, $Sb_2O_3$, $Al_2O_3$, MgO, $Fe_2O_3$, $TiO_2$, TiN, VN, NbN, GaN, $Mo_2N$, $W_2N$, CrN, NbC(N), TiC(N), WC, $Mo_2C$, and $Cr_3C_2$.

28. The composition of claim 23, wherein the nanoparticle has a nanostructure.

29. The composition of claim 28, wherein the nanoparticle has a nanostructure selected from a nanorod, a nanosphere, a nanotetrahedron, a nanohexahedron, a nanofiber, and a nanostar.

30. The composition of claim 23, wherein the nanoparticle has a particle size of about 1 nm to about 80 nm.

31. The composition of claim 23, wherein the organometallic compound is represented by Formula 1:

$$ML_aL'_b \qquad \text{<Formula 1>}$$

wherein, in Formula 1,
M is tin (Sn), zirconium (Zr), zinc (Zn), titanium (Ti), or aluminum (Al);
a and b are each independently an integer of 0 to 2, where $1 \leq a+b \leq 2$; and
L and L' are each independently a substituted or unsubstituted C3-C30 alkoxy group, a substituted or unsubstituted C3-C30 carboxylate group, or a substituted or unsubstituted C3-C30 dicarboxylate group.

32. The composition of claim 23, wherein the organometallic compound is represented by Formula 2:

$$SnL''_2 \qquad \text{<Formula 2>}$$

wherein, in Formula 2,
L" is a substituted or unsubstituted C3-C30 alkoxy group or a substituted or unsubstituted C3-C30 carboxylate group.

33. The composition of claim 23, wherein L" is one selected from the group consisting of —O(O=)C(CH$_2$)$_5$C$_3$H$_7$, —O(O=)C(CH$_2$)$_6$C$_2$H$_5$, —O(O=)C(CH$_2$)$_7$CH$_3$, —OC$_4$H$_9$, —OC$_6$H$_{13}$, and —OC$_8$H$_{17}$.

34. The composition of claim 23, wherein a mole ratio of the main catalyst to the cocatalyst is in a range of about 1:0.01 to 1:3.

35. The composition of claim 23, wherein a mole ratio of the main catalyst to the cocatalyst is in a range of about 1:0.1 to 1:2.

* * * * *